United States Patent [19]

Wang et al.

[11] Patent Number: 5,446,829
[45] Date of Patent: Aug. 29, 1995

[54] ARTIFICIAL NETWORK FOR TEMPORAL SEQUENCE PROCESSING

[75] Inventors: Lipo Wang, Silver Springs; Daniel L. Alkon, Bethesda, both of Md.

[73] Assignee: The United States of America as represented by the Department of Health and Human Services, Washington, D.C.

[21] Appl. No.: 82,003

[22] Filed: Jun. 24, 1993

[51] Int. Cl.[6] .............................................. G06F 15/18
[52] U.S. Cl. ........................................ 395/24; 395/21; 395/23
[58] Field of Search ........................ 395/24, 23, 21, 22

[56] References Cited

U.S. PATENT DOCUMENTS

| 5,119,469 | 6/1992 | Alkon et al. | 395/23 |
| 5,131,055 | 7/1992 | Chao | 382/32 |
| 5,155,801 | 10/1992 | Lincoln | 395/22 |

FOREIGN PATENT DOCUMENTS

9014631 11/1990 WIPO .

OTHER PUBLICATIONS

Hetero Associative Neural Network for Pattern Recognition, Lu et al., IEEE/14–17 Jun. 1989.
Dynamically Stable Associative Learning (DYSTAL): A Biologically Motivated Artificial Neural Network, Thomas et al., IEEE/18–22 Jun. 1989.
DYSTAL: a Self-Organizing ANN with Pattern 2nd Training Time, Barbour et al., IEEE/7–11 Jun. 1992.
Classification of Hand Written Digits and Japanese Kanji, Vogl et al., IEEE/8–14 Jun. 1991.
Alkon, D. L., "Memory Storage and Neural Systems", Sci. Am., 261(1):42–50 (1989).
Alkon, D. L., et al., "Pattern-Recognition by an Artificial Network Derived from Biologic Neuronal Systems", Bio. Cybern., 62:363–376 (1990).
Buhmann, J. et al., "Noise-Driven Temporal Association in Neural Networks", Europhys. Lett., 4(10):1205–1209 (1987).
Coolen, A. C. C. et al., "Image Evolution in Hopfield Networks", Phys. Rev. A, 38(8):4253–4255 (1988).
Dehaene, S. et al., "Neural Networks That Learn Temporal Sequences by Selection", Proc. Natl. Acad. Sci. USA, 84:2727–2731 (1987).
Fukushima, K., "A Model of Associative Memory in the Brain", Kybernetik, 12:58–63 (1973).
Fukushima, K., "Neocognitron: A Hierarchical Neural Network Capable of Visual Pattern Recognition", Neural Networks, 1:119–130 (1988).
Grossberg, S., "Adaptive Pattern Classification and Universal Recording: I. Parallel Development and Coding of Neural Feature Detectors", Biol. Cybern., 23:121–134 (1976).
Guyon, I., et al., "Storage and Retrieval of Complex Sequences in Neural Networks", Phys. Rev. A, 38(12):6365–6372 (1988).
Hopfield, J. J., "Neutral Networks and Physical Systems with Emergent Collective Abilities", Proc. Natl. Acad. Sci. USA, 79:2554–2558 (1982).
Kleinfield, D., "Sequential State Generation by Model Neural Networks", Proc. Natl. Acad. Sci. USA, 83:9469–9473 (1986).
Lippmann, R. P., "Review of Neural Networks for Speech Recognition", Neural Computation, 1:1–38 (1989).
McCulloch, W. S. et al., "A Logical Calculus of the (List continued on next page.)

Primary Examiner—Allen R. MacDonald
Assistant Examiner—Richemond Dorvil
Attorney, Agent, or Firm—Foley & Lardner

[57] ABSTRACT

A computer-based artificial network is presented that is capable of learning, recognizing, and generating temporal-spatial sequences. The network system includes time-delays and artificial neural subnetworks. The system generally includes three parts: (1) comparator units, (2) a parallel array of subnetworks and (3) delayed feedback lines from the output of the system to the neural subnetwork layer.

12 Claims, 14 Drawing Sheets

OTHER PUBLICATIONS

Ideas Immanent in Nervous Activity", *Bulletin of Math. Biophys.*, 5:115–133 (1943).

Nishimori, H. et al., "Retrieval of Spatio-Temporal Sequence in Asynchronous Neural Network", *Phys. Rev. A*, 41:3346–3354 (1990).

Petetto, P. et al., "Colective Properties of Neural Networks", *Disordered Systems and Biological Organization*, Bienenstock, E. et al. (Ed.), (Springer-Verlag, New York), F20:171–185 (1986).

Sompolinsky, H. et al., "Temporal Association in Asymmetric Neural Networks", *Phys. Rev. Letts.*, 57(22):2861–2864 (1986).

Tank, D. W. et al., "Neural Computation by Concentrating Information in Time", *Proc. Natl. Acad. Sci. USA*, 84:1896–1900 (1987).

Unnikrishnan, K. P. et al., "Connected-Digit Speaker-Dependant Speech Recognition using a Neural Network with Time-Delayed Connections", *IEEE Trans. on Signal Processing*, 39(3):698–713 (1991).

Wang, L. et al., "Synchronous Neural Networks of Nonlinear Threshold Elements with Hysteresis", *Proc. Natl. Acad. Sci. USA*, 87:988–992 (1990).

Wang, L. et al., "Interactions of Neural Networks: Models for Distraction and Concentration", *Proc. Natl. Acad. Sci. USA*, 87:7110–7114 (1990).

Wang, L. et al., "Variable Threshold as a Model for Selective Attention, (de)Sensitization, and Anesthesia in Associative Networks", *Biol. Cybern.*, 64:231–241 (1991).

Wang, L. et al., "Chaos, Multiplicity, Crisis, and Synchronicity in Higher-Order Neural Networks", *Phys. Rev. A*, 44(4):R2259–2262 (1991).

Wang, L. et al., "Physical Modeling of Neural Networks", *Methods in Neurosciences*, 10:549–567 (1992).

Zipser, D. et al., "A Model of Hippocampal Learning During Classical Conditioning", *Behav. Neurosci.*, 100(5):764–776 (1986).

(ARCHITECTURE)

(SYMBOL)

(ARCHITECTURE)

(SYMBOL)

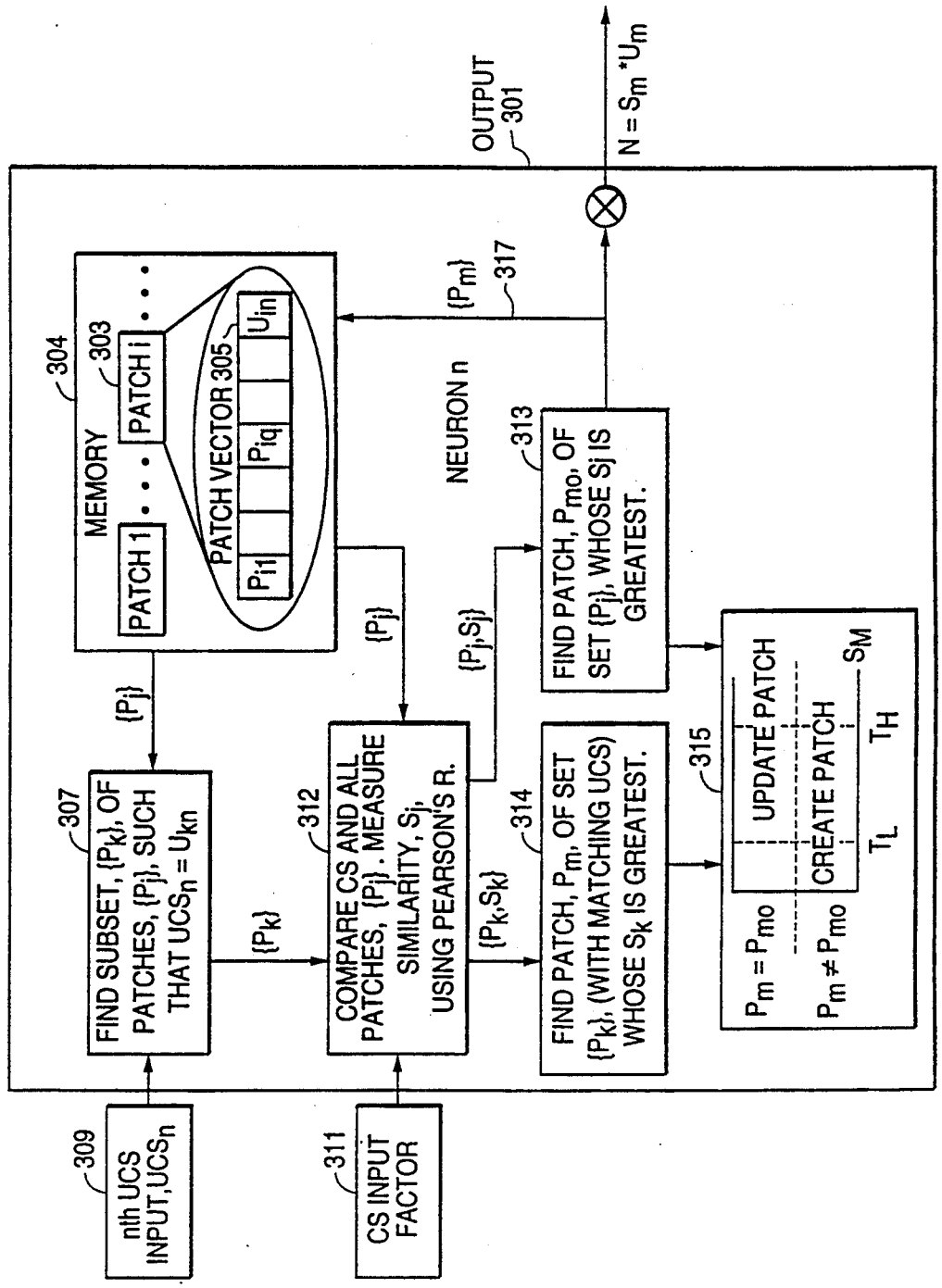

FIG. 7

TRAINING (a) OF A SEQUENCE OF LETTERS

| t | SYSTEM CS | SYSTEM UCS | DYSTAL 1 CS | DYSTAL 1 UCS | DYSTAL 2 CS | DYSTAL 2 UCS | DYSTAL 3 CS | DYSTAL 3 UCS |
|---|---|---|---|---|---|---|---|---|
| 1  | A | A |   | A |   | A |   | A |
| 2  | B | B | A | B |   | B |   | B |
| 3  | C | C | B | C | A | C |   | C |
| 4  | D | D | C | D | B | D |   | D |
| 5  | E | E | D | E | C | E | A | E |
| 6  | F | F | E | F | D | F | B | F |
| 7  | G | G | F | G | E | G | C |   |
| 8  | H | H | G | H | F | H |   |   |
| 9  | I | I | H | I | G | I |   |   |
| 10 | A | A | I | A | H | A |   |   |

FIG. 8

TRAINING OF (b) A SEQUENCE OF NUMBERS

| t | SYSTEM CS | SYSTEM UCS | DYSTAL1 CS | DYSTAL1 UCS | DYSTAL2 CS | DYSTAL2 UCS | DYSTAL3 CS | DYSTAL3 UCS |
|---|---|---|---|---|---|---|---|---|
| 1 | 1 | 1 |   | 1 |   |   |   |   |
| 2 | 2 | 2 | 1 | 2 |   | 1 |   |   |
| 3 | 3 | 3 | 2 | 3 | 1 | 2 |   | 1 |
| 4 | 4 | 4 | 3 | 4 | 2 | 3 | 1 | 2 |
| 5 | 5 | 5 | 4 | 5 | 3 | 4 | 2 | 3 |
| 6 | 6 | 6 | 5 | 6 | 4 | 5 | 3 | 4 |
| 7 | 1 | 1 | 6 | 1 | 5 | 6 | 4 | 5 |
| 8 |   |   |   |   | 6 | 1 | 5 | 6 |
|   |   |   |   |   |   | 2 |   | 1 |
|   |   |   |   |   |   | 3 |   | 2 |

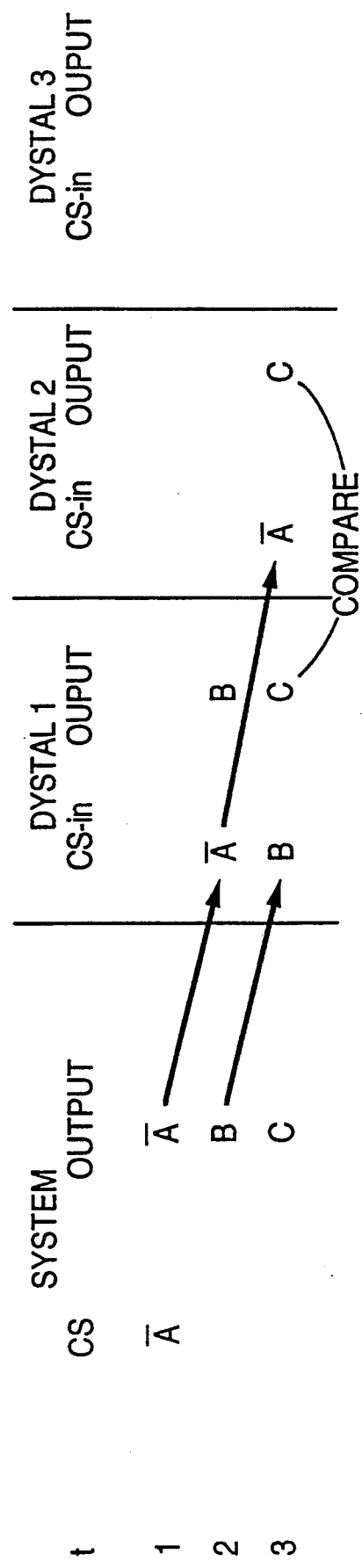

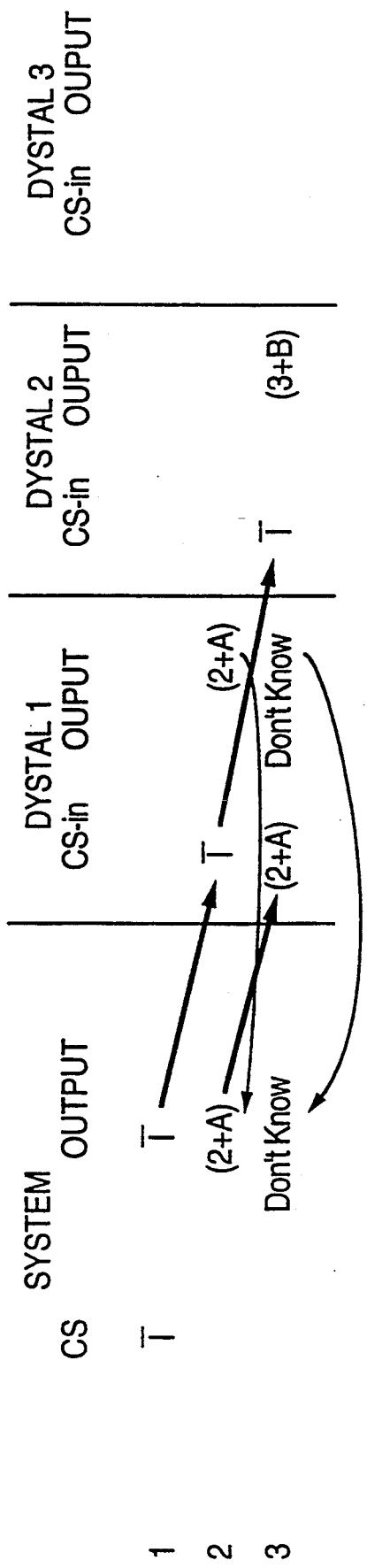

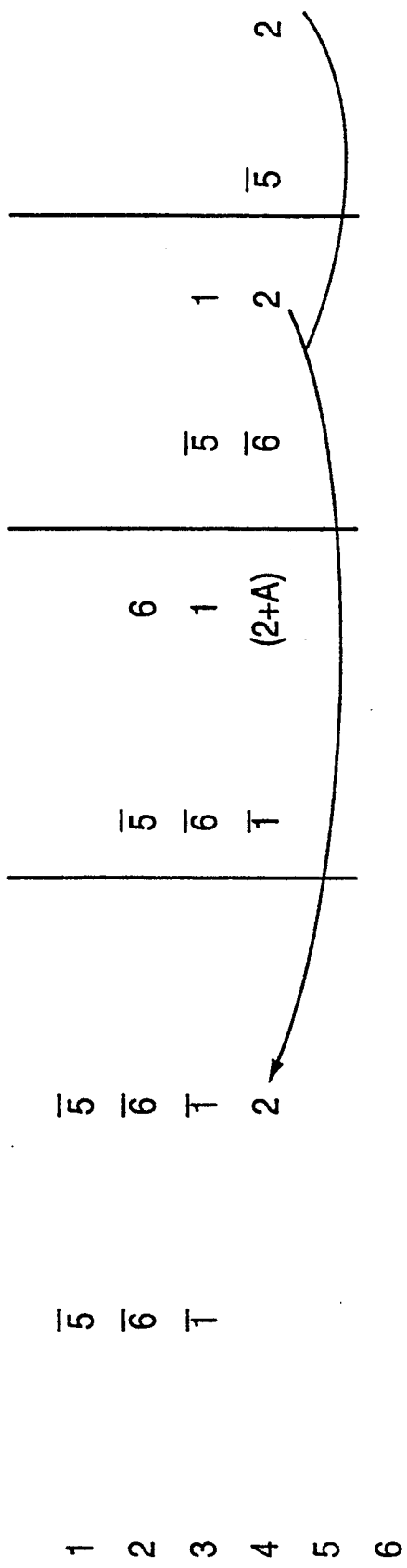

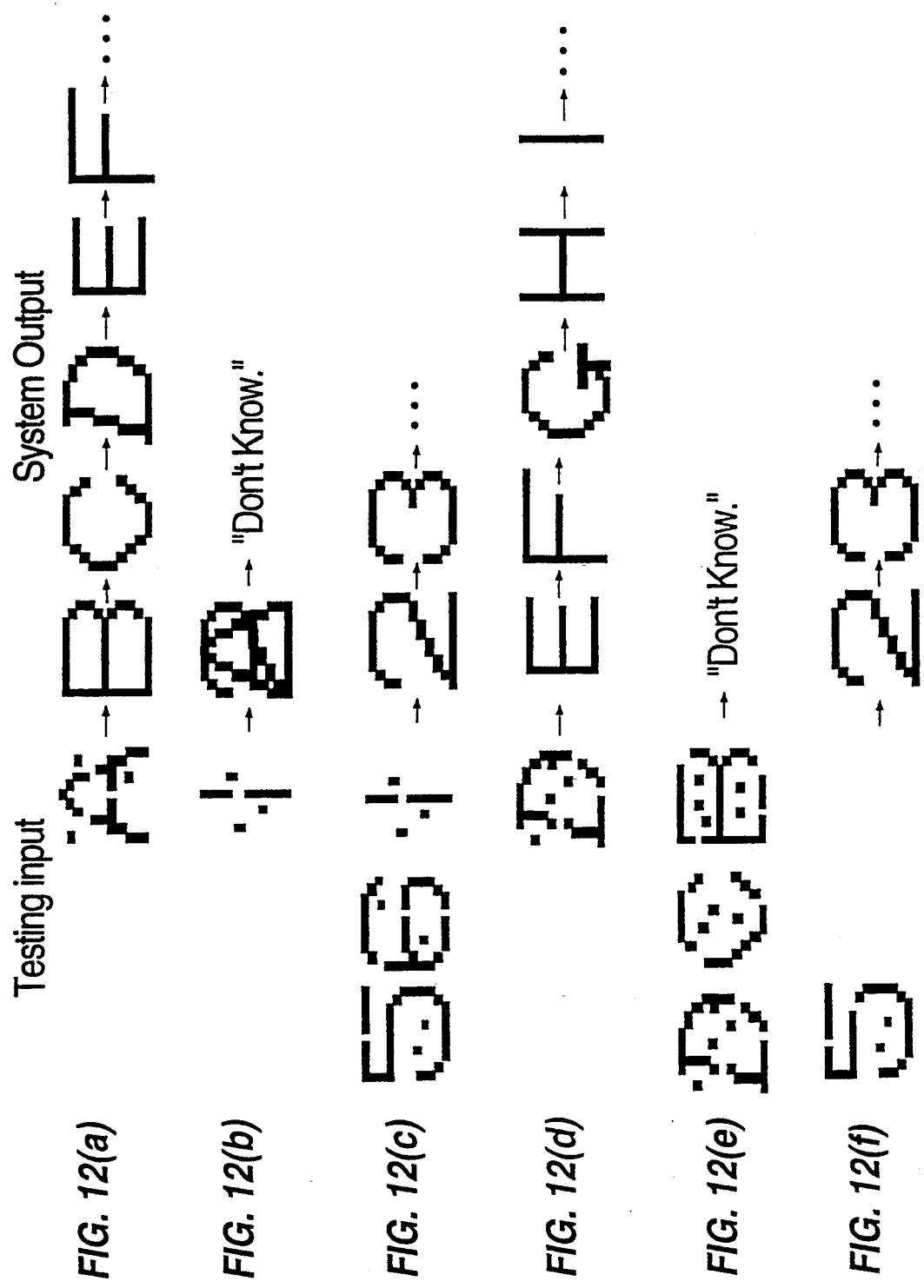

(ARCHITECTURE)

(SYMBOL)

ARTIFICIAL NETWORK FOR TEMPORAL SEQUENCE PROCESSING

BACKGROUND OF THE INVENTION

This invention relates to a computer-based, artificial neural network system for learning, recognizing, and generating temporal-spatial sequences. Use of an array of associative neural networks (ANNs) permits manipulation of complex sequences.

Investigations of neural processing in biological systems have provided information from which artificial neural networks are being developed. However, what evolution has generated, man finds difficult to emulate. Artificial networks are implemented through software and/or hardware to perform functions analogous to those performed by living organisms (for example, pattern recognition and classification), but there are many limitations precluding broad applications to problems of commercial interest.

Conversely, an objective of constructing and testing artificial neural networks, is to develop an understanding of biological neural networks. This information is particularly useful in appreciating and treating human neurological disorders. Many recent observations in the field of neurobiology suggest that biological neurons are much more complex than the kinds of model neurons used in artificial neural networks in the art. Some examples of the complexity are that the learning rule need not be Hebbian (Hebb, 1949), and that learning can occur locally and independently of whether the post-synaptic neuron fires. Furthermore, even to make one association, memory involves the interaction of changes in more than one spatially distinct compartment of the same neuron.

A component which needs to be factored into artificial networks to increase their applicability is the ability of a brain to continuously process temporal information, as the environment changes over time. In particular, the brain routinely and dynamically learns and recalls information. Therefore, integrating temporal adaptive processes analogous to those operative in a brain is a major goal in constructing useful artificial neural networks (ANNs). ANNs have been developed for static processing and for temporal processing. However, systems are not yet available which incorporate temporal processing at a level of complexity that is suitable for useful applications such as the classification of temporal signals. Temporal patterns represented by signals include those generated from time-varying spatial patterns.

Temporal processing includes one or more of the following functions: learning, recalling, classifying, generalizing, or generating time-dependent phenomena. Neural networks that have been developed to perform temporal processing may be divided into two categories: (i) those with time delays and (ii) those without time delays.

Time delays are implemented in a variety of systems, including physical and chemical systems, as well as artificial neural networks. Experimental evidence for neural signal propagation delays has been found in rat hippocampus. Further work is needed to elucidate whether time-delay is actually used in temporal processing in the brain. A theoretical hippocampal model with time-delays has been proposed by Zipser (1986).

Time-delays have been proposed to represent temporal sequences. For example, Fukushima (1973) presented a temporal processing system, in which a number of McCulloch-Pitts neurons are fully connected with Hebbian-type synapses. McCulloch-Pitts neurons (McCulloch and Pitts, 1943) are non-linear processing elements that have two states, i.e., firing and quiescent. Each neuron receives signals from its neighboring firing neurons, and the signals are transmitted through synaptic weights. The neuron then either fires if the total input exceeds a threshold, or remains quiescent. A Hebbian-type synapse is a synapse whose strength increases when the two neurons connected by the synapse fire together at a given instance during learning, and conversely, decreases when only one of the two neurons fires and the other remains quiescent. There are multiple synapses between any two neurons and different time-delays in these synapses.

Fukushima's system operates by associating a spatial pattern with a pattern present at a previous time. However, this formulation has only a limited ability to store sequences, i.e., it is rapidly saturated. Furthermore, this system requires many iterations for sequence retrieval and has great difficulty discriminating non-orthogonal patterns. Non-orthogonal patterns are those for which the mathematical relationship of the vector of binary signals is that their product is not zero, that is, they are not independent. This is in comparison with orthogonal vectors whose product is zero and are independent. Furthermore, images retrieved by this system are often obscured by noise. This noise is referred to as "spurious memories."

Time delays have been incorporated into Hopfield networks (Hopfield, 1982) to generate temporal-spatial sequences (Sompolinsky and Kanter, 1986; Kleinfeld, 1986; Tank and Hopfield, 1987). These systems also use Hebbian learning rules and have problems similar to those of Fukushima's system. The ANN discussed by Guyon et al. (1988) requires that all stored sequences are known analytically a priori. After synaptic connections are calculated, any additional sequences that need to be stored in the system require reconstruction of the entire synaptic connectivity.

Time delays have also been used together with backpropagation networks in processing temporal speech signals (Lippmann, 1989), although back propagation networks are known to have unacceptably long training times due to iterative learning procedures. Other iterative learning algorithms include that used by Unnikrishnan et al. (1991).

A number of ANNs have been reported to generate temporal sequences without time delays. Stochastic noise has been used to induce transitions between attractors in Hopfield networks (Buhmann, 1987). Other existing mechanisms are time-dependent (Peretto and Niez, 1985; Dehaene et al., 1987), asymmetric (Coolen and Ruijgrak, 1988; Nishimori et al., 1990), and diluted higher order synaptic interactions (Wang and Ross, 1990 a, b; 1991 a, b, 1992). But it is not yet straightforward to train these ANNs for practical applications, such as classifications of temporal signals. Limitations on systems are that single values, rather than arrays of data are output; only single neural networks have been used, limiting processing to orthogonal spatial images and data sets; and complex sequences encounter storage limits.

The present invention relates an artificial neural network system which overcomes these limitations by employing a time-delay signal processing method and an array of neural subnetworks. The system may be incorporated into a general neural network such as the DYSTAL (Dynamically Stable Associative Learning Network) associative neural network (Alkon et al., 1990) for the purpose of learning temporal associations. Unlike previously proposed temporal systems, the present invention relates a parallel array of neural subnetworks and a comparator layer to determine the overall output of the network. This design is novel and provides for several advantageous performance features.

SUMMARY OF THE INVENTION

The present invention relates to an artificial neural network system that incorporates time-delay signal circuits, comparator units, and a parallel array of neural subnetworks. This system is capable of learning and recognizing temporal-spatial sequences. A temporal-spatial sequence is defined herein as a time dependent sequence of patterns in a space. Examples of such a sequence include acoustic signals connected to form a speech pattern, robotic and unmanned defense system control commands, and forecasts of multivariable stochastic processes.

Speech processing such as retrieval, production, and recognition, has potential for voice information systems such as electronic telephone systems. In such a system, a computer-based operator answers questions from a caller and initiates an appropriate response, removing the need for human operators. The input to a neural network for this application may be a waveform. Robotic and unmanned defense systems are activated to make movements needed for task performance and for directing missile trajectories by temporal commands.

Multivariate stochastic processes such as weather, earthquake, stock markets and the like, are forecast according to information and experience previously acquired.

A system according to the present invention is able to memorize temporal-spatial sequences after some repeated presentations of these sequences or some variations, such as noisy versions, of these sequences. After learning (training) is completed, the system is able to recall an entire sequence after being presented only a small portion of this sequence which may also be obscured by noise and/or contain gaps (blank spatial patterns).

A system according to the invention requires more than a single image to recall a sequence if that image has occurred in more than one sequence during training.

In general, the system includes two separate input channels: a CS (conditioned stimulus) and an UCS (unconditioned stimulus). To train the system to associate patterns at successive times in a sequence, pairs of sequences of spatial patterns are presented to the CS and the UCS input channels simultaneously. These signals are then transmitted to an array of neural subnetworks embedded in a comparator. After training, a test pattern, which is presented to the CS input 10 channel only, causes the system to output images in a sequence that has been learned.

More specifically, the invention relates a computer-based, artificial neural network system for learning, recognizing, and generating temporal-spatial sequences. The system includes a parallel array of hetero-associative neural subnetworks which receive signals from input channels of the system and produce output signals; the output differs from the input and its noisy versions.

A "signal" is a detectable physical quantity or impulse (such as a voltage, current, or magnetic field strength) by which information can be transmitted; it may be a physical representation of data. Input signals may be generated by an optical scanner, for example, by scanning a visual image, such as a photograph or a handwritten set of numbers, a "chipped" digital image wherein images are digitally extracted from photos into image chips, or an analog output from an instrument, such as an oscilloscope showing a voice waveform. Input signals may be continuous or discrete (binary).

The system also includes N comparator units. Each comparator unit receives inputs from the corresponding output neurons in each neural subnetwork and decides its own output by making the following comparison (comparator rule). (There are N output neurons in each neural subnetwork.) A critical fraction $f_c$, e.g., two thirds is selected, the value being determined by the accuracy desired in a particular application. The higher $f_c$ is, the lower the error rate will be, but there will be more "don't know" answers, during testing the temporal system. If there exists one comparator unit that does not receive the same "know" input from more than the critical fraction of the neural subnetworks, the overall output from the comparator units, thus the overall output from the system, is a "don't know". Otherwise, each comparator unit outputs an average of its inputs from the subnetworks (details are given in the following sections).

A delay element links the comparator output signal with each neural subnetwork, while delaying the signal by a desired length of time. There is one time delay element attached to each subnetwork.

The invention also relates to a method for associating patterns presented to a neural network system in a temporal sequence. The method includes simultaneously presenting signals from pairs of elements of sequences of spatial patterns to a conditioned stimulus channel and an unconditioned stimulus channel of the system, and training the system to associate elements presented to the system at successive times in a temporal sequence. Elements of a sequence to be analyzed by the system are then presented to the conditioned stimulus channel of the system. The sequence is analyzed by using the associations learned during training to predict successive elements in the sequence being analyzed.

In another aspect, the system relates to a signal processing system which includes an array of n subnetworks and a first and a second system input channel. A pair of signals designated a conditioned and an unconditioned stimulus are simultaneously presented to the system for each 1 through m elements of a sequence. An unconditioned stimulus from a first element of a sequence is transmitted directly by means of a signal transmission pathway to a second input channel of each of the subnetworks within the system. The conditioned stimulus of the first element of a sequence is transmitted at a first time to the first input channel of the first subnetwork, and successively at subsequent times to the first channel of each of the subnetworks 2 through n. This signal inputting process is repeated so that elements two through m of the sequence are presented successively to the first and the second input channels of the system. Each subnetwork computes and stores an association between the patterns in the first and second channels of the subnetwork at each time.

The architecture of a neural network according to the invention includes a conditioned stimulus input channel and an unconditioned stimulus input channel. In an illustrative embodiment which employs a hetero-associative subnetwork array such as DYSTAL (Dynamically Stable Associative Learning Network) (Alkon, 1990; 1992), the channels are configured to receive simultaneously pairs of signals from successive elements of a sequence presented at successive times, to associate the elements by means of "patches," to form a sequence by analyzing such associations, and to output the images of the sequence. These input signals generate or modify the "patches," which are storage and processing areas interposed between the input and output elements of the system.

More specifically, patches are created initially by signals input to the system. Patches are storage areas in whatever physical apparatus is used to implement a neural subnetwork of the present invention, and are important elements where signals interact and are modified according to the training set developed for a particular application and the network training rules. In particular, patches are the sites of local learning in the immediate vicinity of paired stimuli (conditioned and unconditioned) where component signals are aggregated and simplified so that subnetwork association learning is made efficient.

Patches are dynamic areas which respond to conditioned and unconditioned stimuli in accordance with various rules and methods, so as to organize signals into classes and/or features and to process the signals, thereby to condense or modify information to achieve goals of particular applications of the subnetwork.

A training or learning rule is a set of relationships that determine how the CS and UCS interact to modify the patches. A difference between training and testing the system, is that patches are not modified in the latter phase.

Significant advantages of the DYSTAL subnetwork are realized with the implementation of dendritic patches which model the local interaction of unconditioned stimuli and conditioned stimuli pathways into two separate input streams. The pathway for the unconditioned stimuli pattern is separate and distinct from the pathway for the conditioned stimuli pattern. Also, in order to induce associative learning, the unconditioned stimuli pattern is presented together with the conditioned stimuli pattern (each to their own input neurons). After the association has been learned, presentation of the conditioned stimuli input alone will elicit, as the output of the subnetwork, that unconditioned stimuli with which that conditioned stimuli has previously been associated.

Considering the input to the neural network system for temporal processing, these channels receive signals from a plurality of sequences which form a complex pattern. The images output by the system include a digitized image. Additional signal processing may be incorporated, for example, sound may be synthesized. A microphone may produce a signal, data may be preprocessed, and features extracted from the digital signal. An analog signal may be converted to a digital signal by sampling.

A system according to the invention is implemented in either software or hardware, for example, with C computer language as a software package. In this embodiment of a software implementation, the outputs of the system at different time steps are stored in computer memory. The time delays in the system are realized by selecting the stored outputs at desired predetermined times, according to a particular application. The system, including synapses, neurons, delays and comparators, can also be readily implemented in hardware, i.e., with electronic components such as resistors, transistors, capacitors, inductors, and the like. Because all logic designs for the system are specified, detailed board-level electronic circuits can be easily designed and fabricated by any company that specializes in Application Specific Integrated Circuit (ASIC). The present system will then take the form of a semiconductor chip (integrated circuit).

In an illustrative embodiment, any arbitrary hetero-associative neural network (HANN), such as a DYSTAL and a back-propagation network, may be used for temporal processing. A network can be trained as an auto-associator, by presenting the same pattern to both the unconditioned stimuli and conditioned stimuli pathways, or as a hetero-associator, by presenting different patterns to the unconditioned stimuli and conditioned stimuli pathways. In an embodiment, a hetero-associative neural network may be formed by two auto-associative neural network (AANNs) in parallel. Therefore, any arbitrary associative neural network, including an AANN, is expected to be suitable for temporal processing in the general framework of the present invention. An AANN outputs a clean image after receiving a noisy version of this image as input.

The temporal processing system maintains the advantages originally shown by a hetero-associative neural network such as DYSTAL (Alkon, 1990), for example, short training time and ability to store a large number of temporal sequences consisting either of orthogonal or non-orthogonal spatial patterns. A system according to the invention can also be generalized for use in any arbitrary associative neural networks for temporal processing.

BRIEF DESCRIPTION OF THE DRAWINGS

FIG. 2b is a symbolic representation, and FIG. 2a is a corresponding architectural structure.

FIG. 3b is the symbolic representation, and FIG. 3a is a corresponding architectural structure.

FIG. 4 illustrates an overview of the operation of the neural network of FIGS. 2 and 3, showing input channels, intermediate processing steps, and output channels.

FIG. 7 shows the training process for a sequence of letters.

FIG. 8 shows the training process for a sequence of numbers.

FIG. 9 shows the testing process for a sequence of letters.

FIG. 10 shows the testing process where I and 1 are indistinguishable.

FIG. 11 shows the testing process of a sequence of numbers.

FIGS. 12a–12f exemplify responses of a neural network system according to the invention, to various input signals.

FIG. 13b is a symbolic representation, and FIG. 13a the architecture of the network.

DETAILED DESCRIPTION OF THE PREFERRED EMBODIMENTS

Figure 1:
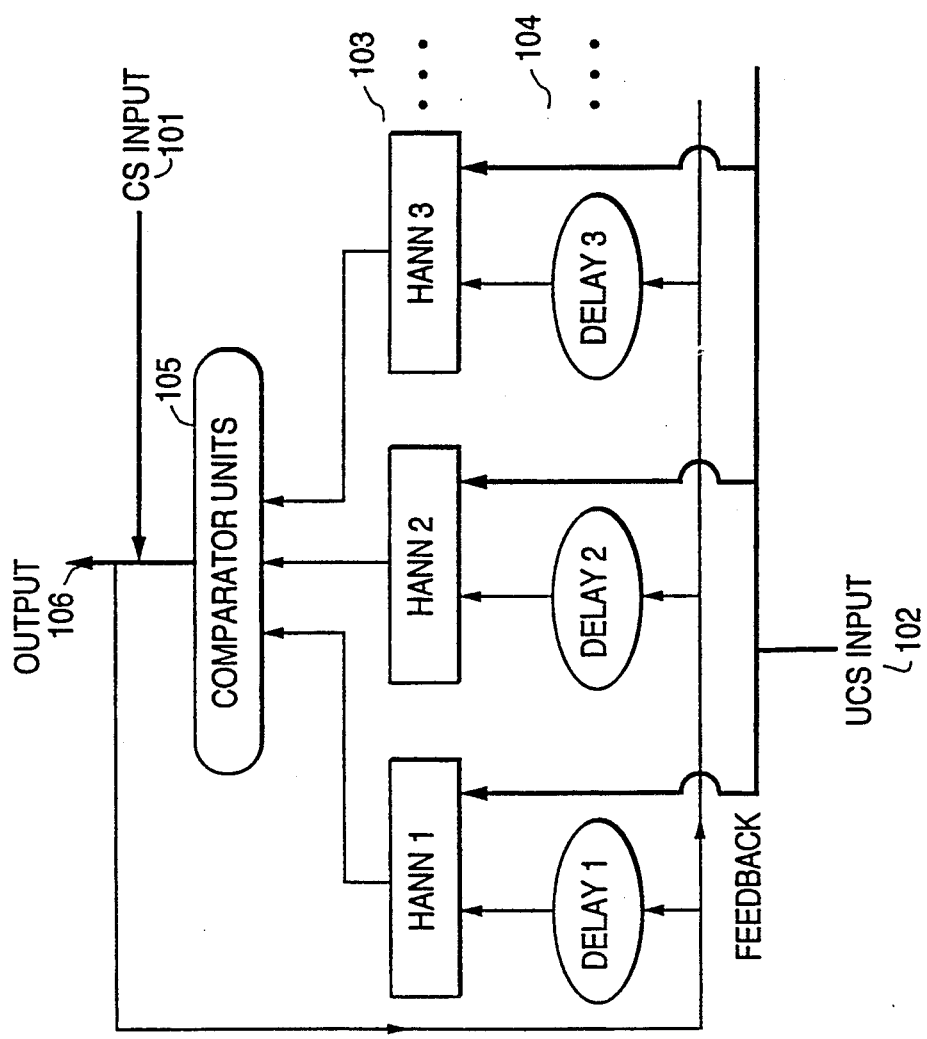
FIG. 1 presents an architecture for a system according to the invention composed of general HANNs (hetero-associative neural networks). The architecture includes (1) comparator units; (2) a parallel array of neural subnetworks; and (3) feedback signal transmission lines with time delays from the output of the system to the subnetworks; and (4) system input and output channels.

The generalized scheme of a system according to the invention is as follows. There are $N_L$ subnetworks, N neurons in each subnetwork, and N comparator units in the system. The time delay associated with the l-th subnetwork delays the signal by l time steps with respect to the current time, where $l = 1, 2, \ldots, N_L$.

The system has two input channels: the CS and the UCS channels, which are analogous to classical conditioning models and to definition of the channels employed in an associative neural network such as (Dynamically Stable Associative Learning Network) DYSTAL (Alkon, 1987, 1989; Alkon et al. 1990, 1992). There are two stages of operations: training and testing. During training, pairs of sequences of spatial patterns are presented to the CS and the UCS input channels simultaneously, whereas during testing sequences are presented only to the CS input channel.

The comparator units output a "don't know" answer if too many subnetworks output conflicting or "don't know" answers, which is further specified mathematically as follows. A critical fraction is chosen, $f_c$, e.g., $f_c = \frac{2}{3}$, and coefficients $\{a_l \geq 0, 1 \leq l \leq N_L\}$ are used to measure the relative importance of each subnetwork. These coefficients and the critical fraction are generally assumed in the present invention to be fixed and do not change during training. Suppose a comparator receives x, which is not a "don't know" as input from subnetwork $\{i_1^x, i_2^x, \} \ldots$, and y, which is not a "don't know", as input from subnetwork $\{i_1^y, i_2^y,\} \ldots$ A weighted fraction for this comparator is computed for each different not-"don't know" input it receives:

$$f^\beta = \sum_{l^\beta} a_l / \Sigma' a_l$$

Here $\Sigma'$ means a sum over only signal-carrying subnetworks, and $\beta = x, y, \ldots$ If there exists one comparator unit such that its weighted fractions for all non-"don't know" inputs from subnetworks are less than the chosen critical fraction, i.e., $$f^\beta < f_c \text{ for all } \beta = x, y, \ldots,$$

this means that too many subnetworks output conflicting or "don't know" answers to this comparator unit and in this case the overall output from the comparator units, thus the overall output from the system, is a "don't know." The system's capability of outputting "don't know" answers can significantly reduce the probability of making errors in practical applications.

There are no particular requirements on how coefficients $\{a_l \geq 0, 1 \leq l \leq N_L\}$ should be chosen. The following rules for coefficient determination are, however, reasonable: (i) All subnetworks are equally important, i.e., all coefficients are the same. (ii) The coefficients decrease monotonically for subnetworks with larger delays, i.e., the earlier the events the less influence they have on the present processes. (iii) More excited, i.e., better matched, subnetworks have larger coefficients.

An individual subnetwork will output a "don't know" or conflict if it does not recognize the input signal. This will occur if the signal is outside of any boundary defined by the training process as a set of elements in a sequence.

Each comparator unit receives outputs of the corresponding neurons in all the subnetworks that carry signals, and computes a weighted average of the outputs, i.e., $$S_i(t) = \phi[\Sigma' a_l O_{il}(t) / \Sigma' a_l], i = 1, 2, \ldots N.$$

Here $S_i(t)$ is the state of the i-th comparator unit of the system, $O_{il}(t)$ is the state of the i-th neuron in the l-th subnetwork. The function $\phi(x)$ rounds up x to the nearest gray shade value.

A neural network system according to the invention may be implemented on several types of neural network architecture.

FIG. 1 shows an architecture which includes hetero-associative neural networks. The system has two input channels; the CS 101 and UCS 102 channels. The UCS channels go directly to the subnetworks, HANN 1, 2, and 3 103, whereas the CS 101 goes successively to each of the subnetworks after a time delay 104. The signals go from the subnetworks to comparator units 105 where they are processed and output as signals on line 106.

FIGS. 2–5 illustrate the elements of an illustrative embodiment of a suitable architecture for the present invention, an associative neural network including a DYSTAL neuron and its patches.

Figure 2A:
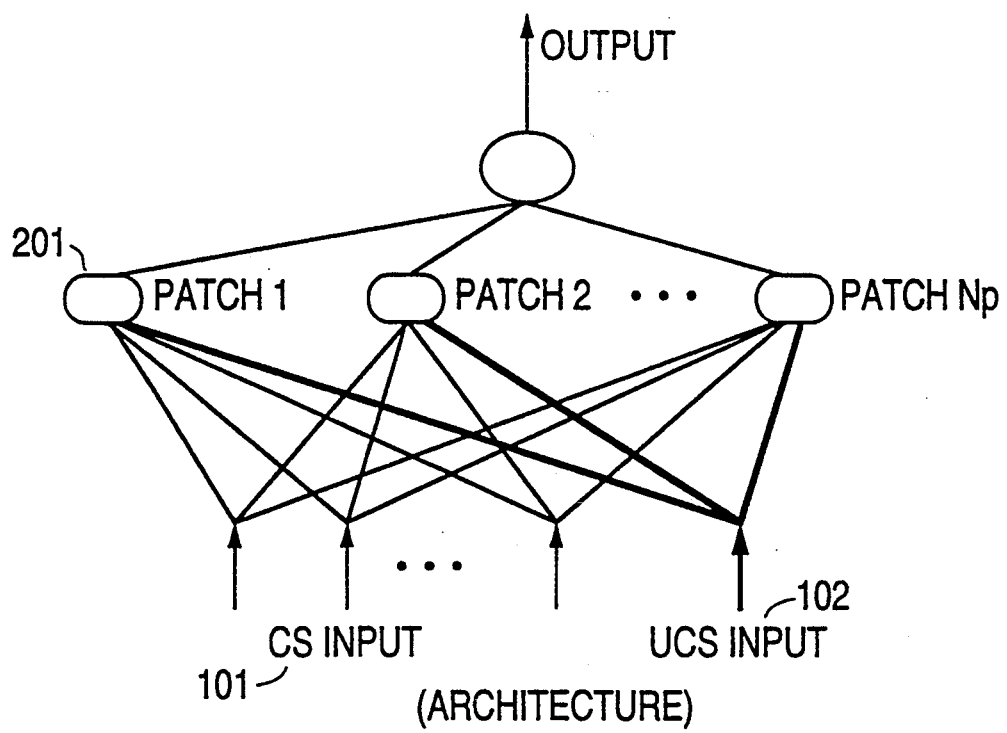
FIGS. 2a and 2b present a schematic diagram of a neuron of an artificial neural network system designated (Dynamically Stable Associative Learning Network) DYSTAL.
Figure 2B:
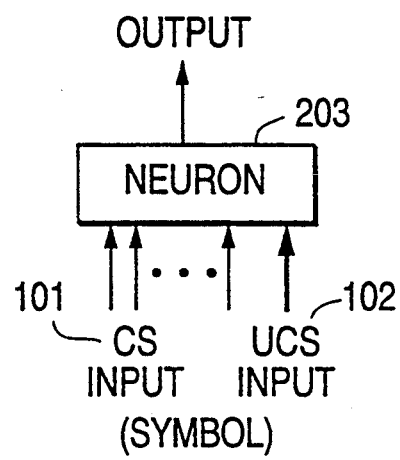

DYSTAL provides an example of a neural network suitable for the implementation of the system of the present invention. FIG. 2 is a schematic representation of a single output neuron and its associated patches. Each patch consists of the patch vector, the expected value of one component of the UCS, and a frequency of use based weight. Each output neuron has many patches and the CS and UCS inputs are connected to the output neuron via the patches. As shown in FIG. 2a, a DYSTAL neuron contains a number of dendritic compartments or synaptic "patches" 201, which are created and modified during learning. In the symbolic representation in FIG. 2b, each neuron has N CS inputs 101 and one UCS input 102, all received by each patch, therefore, there are $N_{cs}$ CS synapses (corresponding to a patch vector) and one UCS synapse in each patch.

In one type of architecture, when a pattern is presented, each neuron compares its input pattern with the patch vector (a stored pattern of CS values) of each of its patches. It then selects the patch with the most similar patch vector (using, for example, Pearson's r, a measure of correlation, as a similarity measure). During training, if the patch vector of the selected patch is not sufficiently similar to the input pattern, or if the UCS value stored in that patch differs from the input UCS value, a new patch is created. Otherwise, the patch is considered matched and is updated.

When a new patch is created, it has a patch vector equal to the input CS pattern for the neuron, and a UCS value equal to the input UCS value for the neuron. When an extant patch is matched, both the patch vector and UCS value are updated to become an approximation of the average of all of the input patterns which have matched the patch. During both training and testing, the neuron outputs (propagates) the UCS value of the active (matched or created) patch, which, when appropriate for a specific application, may be multiplied by the similarity value calculated for the active patch. Therefore, upon presentation of a CS input pattern, a network produces the associated UCS pattern for output.

Figure 3A:
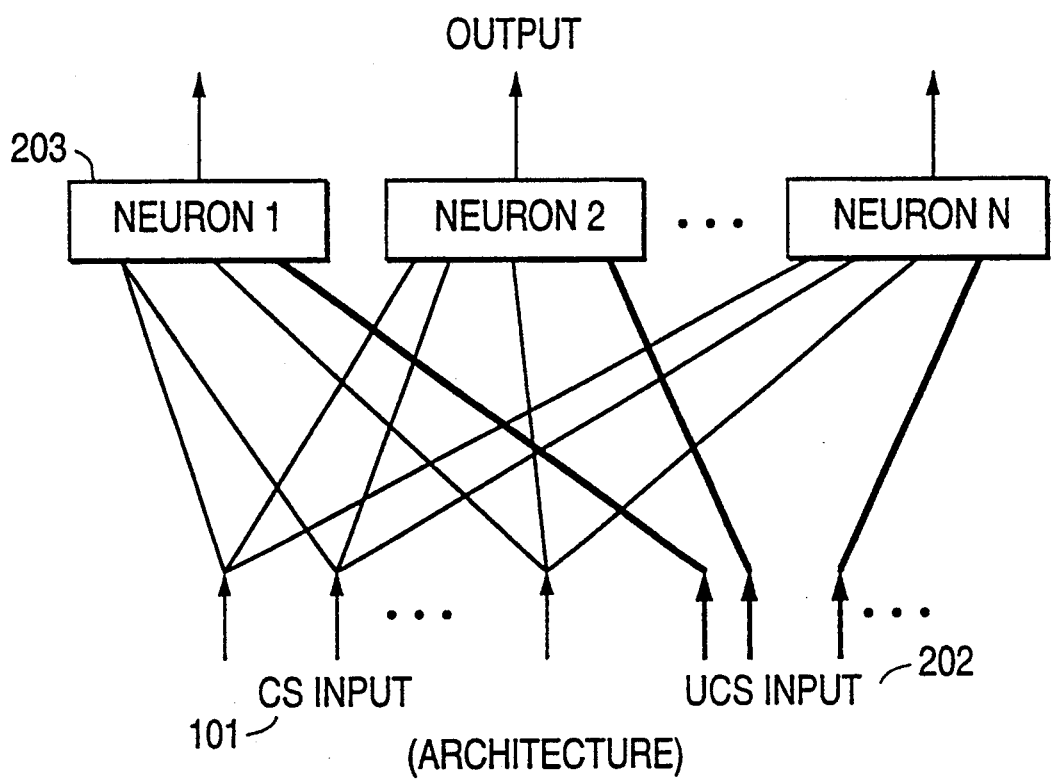
FIGS. 3a and 3b are schematic diagrams of a plurality of neurons included in an artificial neural network designated DYSTAL.
Figure 3B:
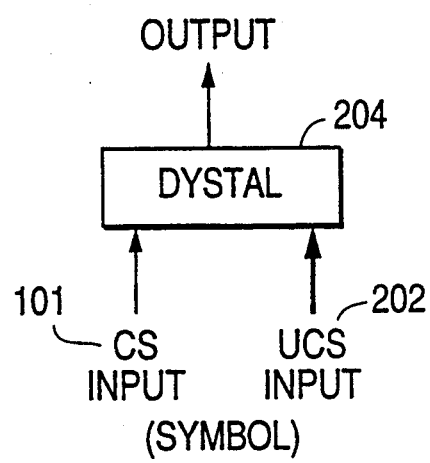

As shown in FIG. 3a and 3b, a DYSTAL neural network (DNN) 204 contains N DYSTAL neurons 203 shown in FIG. 2 arranged in parallel to share common CS and UCS input fields. The dimension of the CS input vector is designated herein by $N_I$. Usually $N_{cs} \leq N_I$, i.e., a patch evaluates only a portion of the input field. Each CS input 101 is routed to each neuron while each UCS input 202 is routed only to its corresponding neuron.

In still further and preferred embodiments, each subnetwork output element has a dynamically allocated number of memory storage devices known as "patches." Each patch stores a single association between (1) the portion of the conditioned stimuli (CS) input in the output element's receptive field; and (2) that element of the associated unconditioned stimuli (UCS) input related to that output. The memory of an entire CS pattern is distributed over many patches and output neurons, each of which learns a portion of the pattern.

A patch is composed of: (1) a patch vector, which is the average value of the CS input patterns that it has matched (each component of the patch vector is real-valued and receives input from a single CS input element); (2) the expected value for the UCS component associated with this CS and output neuron; and (3) a weight that reflects the frequency of use of the patch. Every patch of a given output neuronal element is connected to the same subset of CS inputs. Thus, each patch learns an association between a CS input sub-pattern and a component of the UCS input by storing both the vector of CS input values and the value of the UCS input component.

In an extension of the subnetwork embodiment suitable for gray-scale pattern recognition, patch information is stored as multi-bit values and the similarity between patch vectors and input pattern is computed using a geometrically specific function of the stored patch vector. The input signal pattern is transmitted by the direct connection. A suitable function includes Pearson's R which provides a range between $-1$ and $+1$ (inclusive) that provides a measure of correlation, with $+1$ indicating complete correlation, a $-1$ indicating negative anti-correlation, and a zero representing no correlation. The signal propagated is a function of the computed similarity between the patch vector and the input pattern, and all patches above a computed-similarity threshold participate in signal propagation. In the extended network, the learning rule for calculating the weight on the patch includes storing a moving average of CS signals, and storing a moving average of the unconditioned stimuli signal to allow gray scale values to be learned, distinguished and reproduced. Additionally, the frequency of use of each patch is determined and, where the frequency of use is below a certain value, that patch is removed.

Prior to training, no patches exist. All patches are created during training. The number and content of the patches are determined dynamically as a function of the training set and a few global network parameters. A similarity measure compares the portion of the CS pattern in its receptive field to any pre-existing patch. The comparison consists of the computation of a similarity measure, such as the Hamming distance, or a correlation between the incoming CS pattern and the pattern stored in the patch vector. A measure suitable for use in DYSTAL is Pearson's R.

The design of DNN leads to several computational advantages. For instance, DNN learning is non-iterative and therefore fast. DNN can store, recall, and classify a large number of non-orthogonal patterns.

An overview of DYSTAL processing, which is executed independently for each output unit 301 is shown in FIG. 4 for the nth output unit. FIG. 4 represents a decision space for variable size patch creation using thresholds; if the similarity $S_m$ of the incoming CS pattern to the most similar patch with a matching UCS value $P_m$ exceeds $T_H$, then that patch is updated. If $S_m$ is less than $T_L$, then a new patch is created. If $S_m$ is between the two thresholds, then a new patch is created if $P_m$ is not the most similar patch overall, $P_{mo}$. A patch, $P_{I...i}$ 303 stored in memory 304 includes a patch vector $P_{i,i}...k_{iq}$ 305 and the component 307 of the UCS vector $V_{in}$ applied at 309 that is assigned to that output unit. Each patch includes a patch vector that contains the running average values of the conditioned stimulus (CS) and one component of the unconditioned stimulus (UCS). Thus, the number of components in the UCS vector, and the number of output units is the same. The incoming CS input pattern, CS input vector 311 is compared to the patch vector of every patch stored in the output unit as shown in block 312. $P_i$ is the i-th patch vector and $S_j$ is the similarity measure of that CS input to the i-th patch. Pearson's R is suitable for use as a similarity measure; a normalized dot product would also be suitable. The patch with the greatest $S_j$, independent of the value of the UCS, is designated $P_{mo}$ as shown in block 313. The patch with the greatest $S_k$ and with a sufficiently similar UCS is designated $P_m$ with similarity $S_m$ as shown in block 314. As shown in block 315, if $S_m$ exceeds a threshold $T_H$, then that patch is updated by a running average; if $S_m$ is less than another threshold $T_L$ a new patch is created. If $S_m$ lies between $T_L$ and $T_H$ then a new patch is created, if $P_m$ is not the same patch as $P_{mo}$. The only output from the patch to memory is $P_m$ as shown on line 317.

Figure 5:
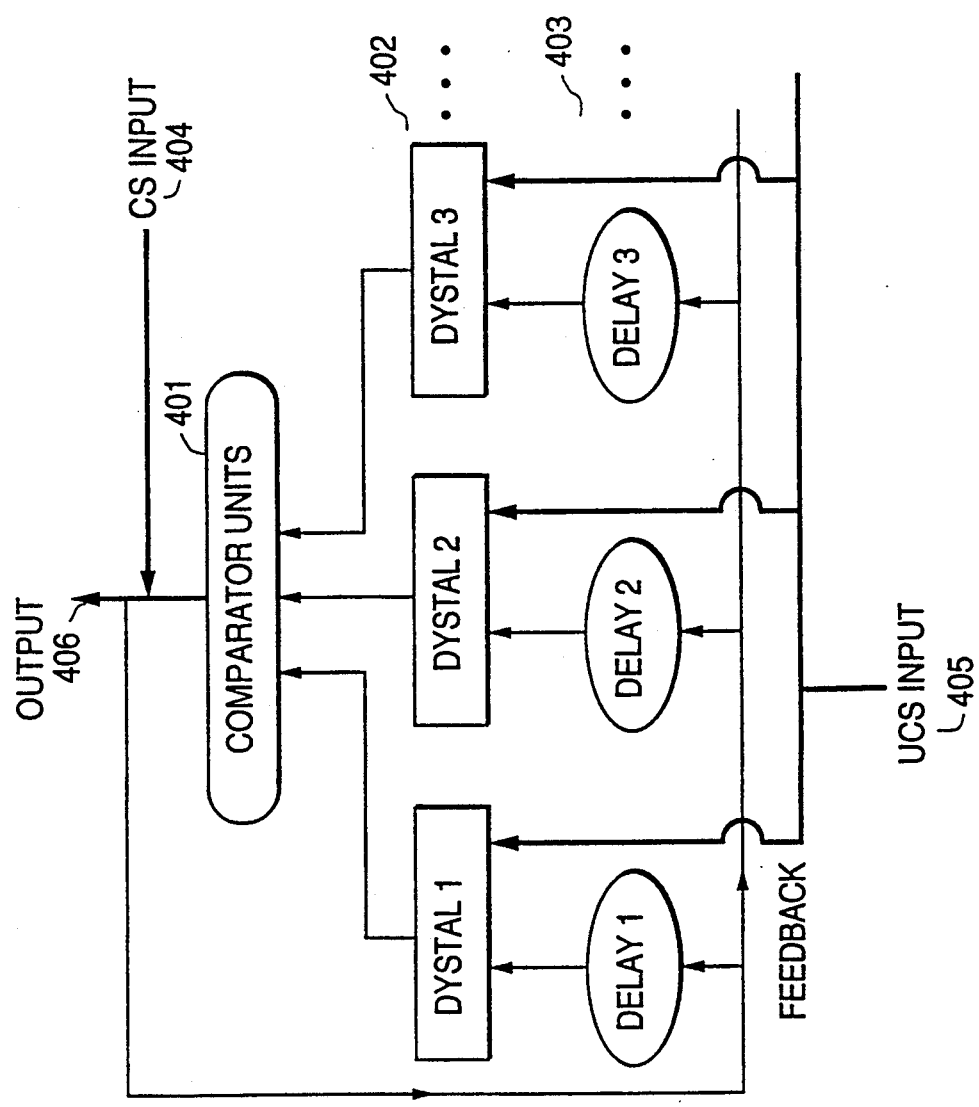
FIG. 5 illustrates an architecture for temporal-spatial processing in the present invention realized with DYSTAL subnetworks.

FIG. 5 is a schematic diagram of an architecture of a system for temporal processing that is able to achieve the goal of the invention, using DYSTAL subnetworks as specific HANNs as shown in FIG. 1. The architecture consists of three parts: (1) the comparator units 401, (2) the neural subnetworks (DYSTAL) 402; (3) the time delays 403; and (4) input and output channels 404, 405, 406.

Figure 6A:
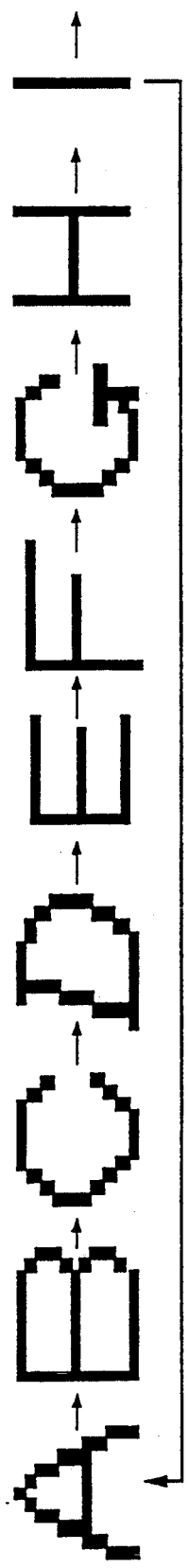
FIG. 6a and 6b present two temporal sequences which are suitable as input to a system according to the invention.
Figure 6B:
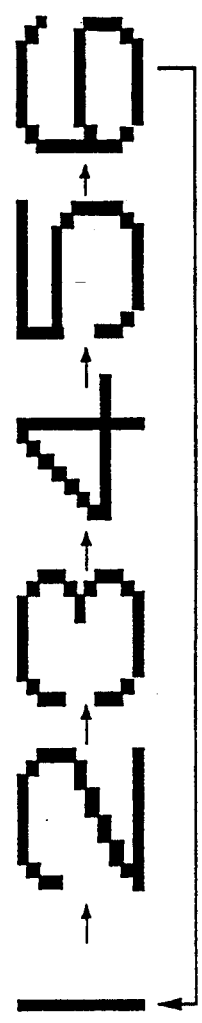

An objective of the invention is to learn temporal-spatial sequences. A temporal-spatial sequence is defined herein as a time-dependent sequence of spatial patterns. FIG. 6a and 6b show two examples of such sequences: Sequence (a) {ABCDEFGHIAB ... }, Sequence (b) {12345612345 ... }. To facilitate a performance comparison, the same sequences used by Fukushima (1973, 1988), where pattern "l" is the same as pattern "I" are used for determining the accuracy of system output when two pattern elements are not distinguishable. The cyclic nature of the sequences is not required for operation of the present invention. By way of example, each sequence consists of several individual spatial patterns that are 11×11 pixels in size. Each spatial pattern appears at a time step in the order shown by the arrows. The spatial patterns are used as training sequences to the system. (FIGS. 7 and 8). The results of testing after training are presented in FIGS. 9-12.

During training, paired sequences are presented to the system through the two input channels, and learning is achieved through the hetero-associations in the subnetworks embedded in the system. One of the two sequences in each training pair, the "CS sequence," is fed into the "CS input" channel. (FIGS. 1, 5). The UCS sequence in the pair, the expected output of the system corresponding to the signal sequence, is fed into the "UCS input" channel. The two sequences in each training pair may be the same, or one may be a variation, e.g., a noisy or distorted version, of the other. Thus, each training pair represents one temporal sequence to be stored in the system.

As illustrated in FIG. 7, during training, at time $t=1$, the first letter of the sequence, A, is input to both CS and UCS inputs of the system, and to the UCS channels of all 3 subnetworks. At time 2, the second letter in the sequence, B, is similarly presented. At time 2, the first subnetwork receives the signal for A, after a time delay occurring since time 1. Therefore, an association occurs in subnetwork 1 between A and B. At time 3, a C is presented to the system and to the UCS channels of the 3 subnetworks. At time 3, B is received as a CS signal in subnetwork 1 after a time delay occurring from time 2, and subnetwork 2 receives the CS signal for A after a time delay from time 1. The input patterns continue in this fashion until the entire sequence has been read into the system, and input may continue from the beginning of the sequence until all 3 subnetworks have a complete set of associations of the pattern. The CS-UCS associations differ in each subnetwork, reflecting the difference in time delays.

FIG. 8 shows similar training for a sequence of numbers.

After training, each subnetwork has learned the correlations among pairs of patterns corresponding to different time steps and, thereby the system has learned the temporal sequence.

During testing, a small piece of a stored sequence, that need not be contiguous but may include gaps in the sequence, and which may or may not be obscured by noise, is presented to the system through the CS input channels. The UCS input channels are not used during testing. The output will be the corresponding expected output sequence in a successful retrieval.

In FIG. 9, a noisy "A" (denoted by $\overline{A}$ in FIG. 9), is shown presented at $t=1$. The quotation signs signify an image of the letter A. The noisy "A" is output from the system. At time 2, the noisy A reaches the CS of the first subnetwork. It is within the criteria for recognition as an "A" so subnetwork 1 outputs a "B" which the subnetwork had learned to associate with A during training. The system output is therefore, a "B". At time 3, the noisy "A" reaches subnetwork 2 where it is output as a "C". The "B" reaches the first subnetwork which is trained to also output a "C" after receiving "A" and "B". Thus, subnetworks 1 and 2 have matching outputs.

Because subnetwork 1 also outputs a "C" the system response is a "C". In the case of 3 subnetworks and $a_1=a_2=a_3$, a correlated response by any 2 subnetworks becomes the system response.

In FIG. 10, at time $t=1$, a noisy "1" (note that "I" is the same as "1") is presented to the system, subnetwork 1 becomes "confused" and outputs an "average" of "2" and "A" which is also the system output at $t=2$. At $t=3$, subnetwork 1 outputs "don't know" because its input, an "average" of "2" and "A" is not recognized by the first subnetwork. At $t=3$, subnetwork 2 outputs an "average" of "3" and "B" because its input is a noisy "1". The system outputs a "don't know" because one out of two signal-carrying subnetworks outputs "don't know."

Operation of the system to overcome ambiguous input is illustrated in FIG. 11. Testing a sequence of numbers is shown in FIG. 11. In a preferred embodiment, more than one subnetwork signal transmission pathway and more than one time delay is used in the system when there are common spatial patterns among different sequences, such as the case shown in FIGS. 6 and 11 where pattern "I" appears in both sequences. The larger the number of subnetworks in the network layer, the better the performance, and of course, the more computationally intensive is the system. It should be noted that the feedback signals through the time delays do not perform any error minimization functions. A noisy "5" is read in at $t=1$, so the system output at $t=1$ and the CS input to network 1 at $t=2$ is a noisy "5". However, if the noisy "5" is within the criteria recognizable as a "5" the output of network 1 at $t=2$ is a "6". At $t=3$, a noisy "1" is read in and is confused with an "I". Network 1 receives the noisy "1" as a CS input at $t=4$, and outputs an average of "2" and "A".

However, at $t=4$, 2 of the 3 networks have properly output a "2," therefore, the sequence can be properly identified.

The learning and recalling mechanisms of the system can be more clearly demonstrated through the following examples of use of DYSTAL subnetworks (DNNs) to implement the present invention and pattern recognition of a sequence of letters or numbers.

Three DNNs ($N_L=3$) were used in this example. The same connections were selected between the comparator units of the system and the DNNs ($a_1=a_2=a_3=1$). In addition, both dimensions of the CS and UCS patterns were selected to be a matrix of dimensions $N=11\times11$.

The system was trained to store ten sequences, two of which are shown in FIG. 6a and 6b, respectively, and then the system was tested.

During training, sequence (a) was presented simultaneously to the CS input and UCS input channels. At time $t=1$, the output of the system was pattern A. The UCS input for the first DNN was also A, however, learning did not occur at $t=1$, because there were no CS inputs to any of the three DNNs from the delayed feedback. At time $t=2$, the output of the system and the UCS input for the first DNN were both pattern B. The CS input to this DNN from the delayed feedback was the output of the system at the previous time step, which was pattern A. Hence the first DNN learned the association between the CS A and the UCS B at $t=2$. The second and third DNNs did not learn it at $t=2$.

Similarly, at time $t=3$, the first DNN learned the association between the CS B and the UCS C, the second DNN learned the association between the CS A and the UCS C, while the third DNN remained inactive. At t=4, the UCS D was associated with C by the first DNN, with B by the second DNN, and with A by the third DNN. Sequence (a) was thus stored into the system. The system learned sequence (b) in the same way.

The examples given in FIGS. 12(a)–12(f) are illustrative of how the system operates at the testing stage. Responses of the system to various input signals are shown in FIGS. 12(a)–12(f). The two sequences shown in FIGS. 6(a) and 6(b) were stored in the system through training. In FIG. 12(a) a noisy pattern "A" was retrieved as Sequence (a). In FIG. 12(b) a noisy pattern "I" was insufficient to make a retrieval. In FIG. 12(c) more information was required; FIG. 12(d) shows the response to a non-orthogonal pattern "D". FIG. 12(e) shows the response to an unknown sequence. FIG. 12(f) shows the response to input with missing images.

If "$\overline{A}$" which denotes a noisy "A" was presented to the system at time t=1 (FIG. 12(a)), the system output an "$\overline{A}$" at time t=1. At t=2, the CS input for the first DNN was the output of the system one time step before, which was "$\overline{A}$". Because the UCS corresponding to an "A" in the training stage was "B," and the amount of noise in $\overline{A}$ was shown to be tolerable by the DNN, the output vector of the first DNN was a "B". At time t=2, other DNNs do not respond because they do not receive any input. Consequently, the output of the system at time t=2 was "B".

At time t=3 the input to the first DNN was the output of the system at time t=2, which was "B". Hence the output of the first DNN was "C". Similarly, the output of the second DNN was also "C" after receiving a CS input of "$\overline{A}$". There were still no inputs for the third DNN. Therefore, the output of the system was "C" at time t=3. The system output the sequence in FIG. 12(a) when presented with a noisy pattern "A". All retrieved images were noise-free, whereas some retrieved images, i.e., "E" and "F" were imperfect in Fukushima's system cited herein.

If initially at time t=1 a "$\overline{i}$" (a noisy "1" note that "I,, is the same as "1") was presented to the system, DNN 1 became "confused" and output an "average" of "2" and "A" which was also the system output at t=2. At t=3, DNN 1 output "don't know" because its input, an "average" of "2" and "A" was not recognized by the first DNN. At t=3, DNN 2 output an "average" of "3" and "B", because its input was a "$\overline{1}$". The system output a "don't know" because one out of two signal-carrying DNNs output "don't know" (FIG. 12(b)). The ability of outputting a "don't know" answer often can significantly reduce error rate in practical applications. This is in contrast with Fukushima's system which outputs a meaningless sequence in this kind of situation.

If a longer piece of the sequence, e.g., $\overline{561}$, was presented to the system instead of a "$\overline{1}$" alone, however, the system was able to recognize the sequence and retrieve the sequence in FIG. 12(b) in the following way. The system outputs "$\overline{5}$""$\overline{6}$""$\overline{1}$" at t=1, 2, 3, respectively. At t=4, the output of DNN 1 is an "average" of "2" and "A" however the outputs of DNNs 2 and 3 are both "2". Therefore, the system output a "2" at time t=4, and so forth (FIG. 12(c)). Similarly, when "GHI" was presented to the system instead of a $\overline{1}$ alone, the retrieval was Sequence (a).

This retrieval using the present invention was in contrast to what occurs when an image "D" is presented to Fukushima's system. The retrieval of the Sequence (a) in FIG. 12(a) becomes very difficult because it takes many iterations, and many retrieved images are imperfect. This is because Fukushima uses a Hebbian-type (dot-product) learning rule which imposes a strict orthogonality requirement on all images in stored sequences. A system according to the invention retrieves the sequence in FIG. 12(a) accurately and quickly (FIG. 12(d)). Therefore the system of the present invention has less restriction on training sequences and works faster than previous systems.

When an unknown sequence, e.g., "$\overline{DCB}$" (FIG. 12(e)), was presented to the above trained system, the first, the second, and the third DNN output "C", "E", and "G", respectively. Because less than two-thirds of the DNNs gave the same output at a given time step, the comparator units halted the feedback operation and output a "don't know" answer. Fukushima's system was not tested in this type of situation, but can be expected to yield meaningless output because it is unable to give a "don't know" answer.

FIG. 12(f) shows an example of the system's response when two frames of input sequence were missing.

Although the system for temporal processing presented herein did not saturate after learning ten sequences, it should on a theoretical basis store many more sequences with minimal saturation. This is illustrated by DNNs used within the present system that create memory "patches" as they learn new associations. The theoretical memory capacity, i.e., the maximum total number of different spatial images in all stored sequences, is $2^N$, N being the number of neurons, whereas the memory capacities of systems using Hebbian-type learning rules are on the order of N. There are no additional limits on the number of sequences and the length of a sequence that can be stored. Because back-propagation systems (BPS,) do not create new memories as they are trained, they saturate quickly, though conclusive investigations on memory capacities of BPSs are still lacking.

Compared with back-propagation temporal systems, the system of the present invention also has advantages in addition to minimal saturation. These advantages include fast training and testing response, and the ability to process sequences with ambiguous images, e.g., the $\overline{I}$ in FIGS. 12b, 12c and 12d.

The system of the present invention can learn, recognize, and generate temporal-spatial sequences using time-delays and an array of subnetworks. After training with temporal sequences, the system is able to recognize and generate the whole sequence after being presented with a small piece of the sequence, which may or may not be obscured by noise and may or may not contain gaps. Alternatively, after training and when a sequence of events is presented to the system, the system predicts the sequence of events in the future.

Compared to other neural network temporal processing systems, the novel features of a temporal processing system according to the invention include fast training and response, non-iterative function, few constraints on individual spatial images in sequences, and minimal saturation. These properties are very desirable for practical applications such as real time speech processing.

A system according to the invention can be used for speech processing. Speech signals are temporal sequences derived from acoustic elements. A speech waveform may be generated for a sentence or phrase, for example. Speech waveforms representing the same sentence or phrase as spoken by several different speakers can be very different and speech processing is thus difficult.

The acoustic signals are generally digitized and recorded for further processing. The amount of data in a digitized speech recording is routinely very large (~60,000 data points per sentence). Because of the large amounts of data, preprocessing of the raw data is preferred prior to entry into the neural network system of the present invention. As an example of such preprocessing, acoustic features, such as a sepstral coefficient, are extracted from each spoken word and are used as arrays of data for input to the present system.

The features are then input into a system according to the invention disclosed herein, so that speech signals are learned during training and subsequently recognized during testing, even if the signals are noisy or incomplete. These inaccurate signals may result from technically poor transmission or a speech impairment in a speaker.

By application of the methods of the present invention, clear speech signals are generated despite noisy or incomplete signal input. This capability is useful when questions are trained with corresponding answers, for creation of an automatic voice information system.

In some practical applications, signal patterns such as those in a word occur at different rates. Existing temporal systems handle this problem with difficulty. To apply a system according to the invention for speech processing, the speech signals are preprocessed so that the signals are presented to the system at a predetermined rate.

The rate-independence problem may be addressed by incorporating the present system in a system with (1) variable time delays and (2) temporally persistent responses of biologically realistic neuronal elements, such as those in Alkon et al. (1990).

Figure 13A:
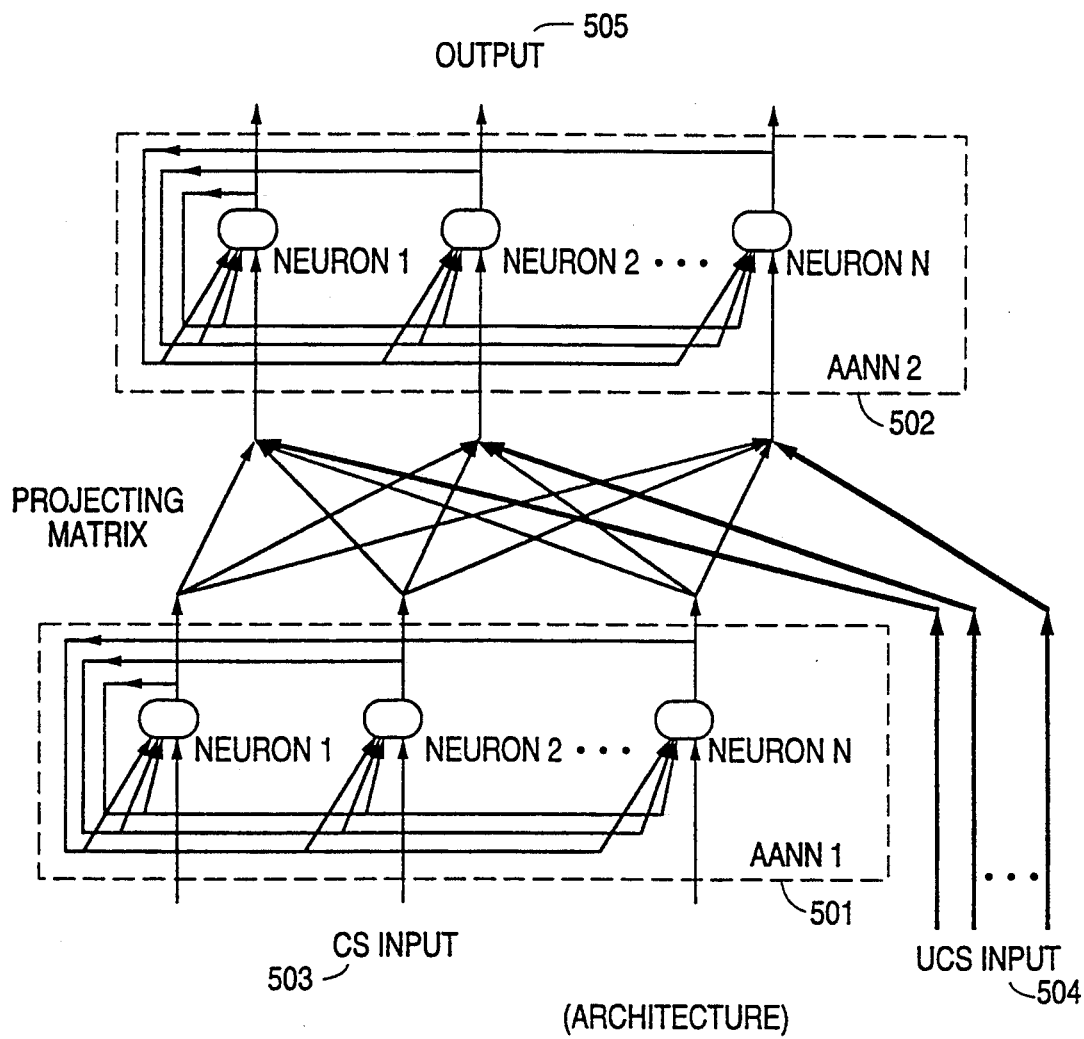
FIG. 13a and 13b present a schematic diagram of a hereto-associative neural network (HANNA) comprising two auto-associative neural networks (AANN1 and AANN2) in parallel.
Figure 13B:
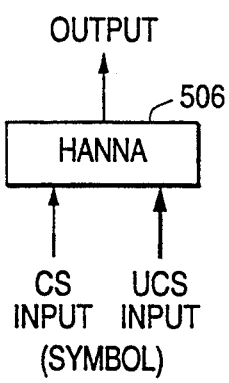

Auto-associative neural networks (AANNs) can also implement the present invention, as shown in FIGS. 13a and 13b. FIG. 13a illustrates the architecture, and FIG. 13b the symbolic representation of the system. Two of the same auto-associative neural networks (AANNs) 501, 502 are positioned in parallel, and each neuron in one of the networks projects signals to neurons in the other network. The projecting network receives input 503, 504 and the projected network generates output 505 for the combined network 506. If a number of patterns are stored in each of these two AANNs, the connections between the two networks may be chosen in such a way that one pattern in the projecting network invokes a different pattern in the other network, thus achieving hetero-associations.

Because there can be a maximum $N^2$ connections between the two networks, N being the number of neurons in each network, a maximum N pairs of hetero-associations can be stored by this arrangement. The projecting matrix may be obtained by solving a set of linear equations after the patterns to be hetero-associated are known. Explicitly, if the combined network is required to output pattern $S^{p(1)} = \{S_1^{p(1)}, S_2^{p(1)}, \ldots, S_N^{p(1)}\}$ when the input pattern is $S^{p(2)} = \{S_1^{p(2)}, S_2^{p(2)}, \ldots, S_N^{p(2)}\}$, where $p = 1, 2, \ldots N$ (a total of $N$ pairs), i.e., $(S^{(1)})^t = TS^{(2)}$, where $T = \{T_{ij}\}$ is the projecting matrix between the two AANs, $S^{(a)} = \{\bar{S}_1^{(a)} \bar{S}_2^{(a)} \ldots \bar{S}_N^{(a)}, a = 1, 2,$ and $(S^{(1)})^t$ is the transposed matrix of $S^{(1)}$. Thus the projecting matrix can be solved by $T = (S^{(1)})^t (S^{(2)})^{-1}$, where $(S^{(2)})^{-1}$ is the inverse matrix of $S^{(2)}$.

The projecting matrix may also be obtained by a simple but less rigorous formulation as in Sompolinsky and Kanter (1986):

$$T_{ij} = \sum_{p=1}^{N} S_i^{p(1)} S_j^{p(2)}$$

Figure 14:
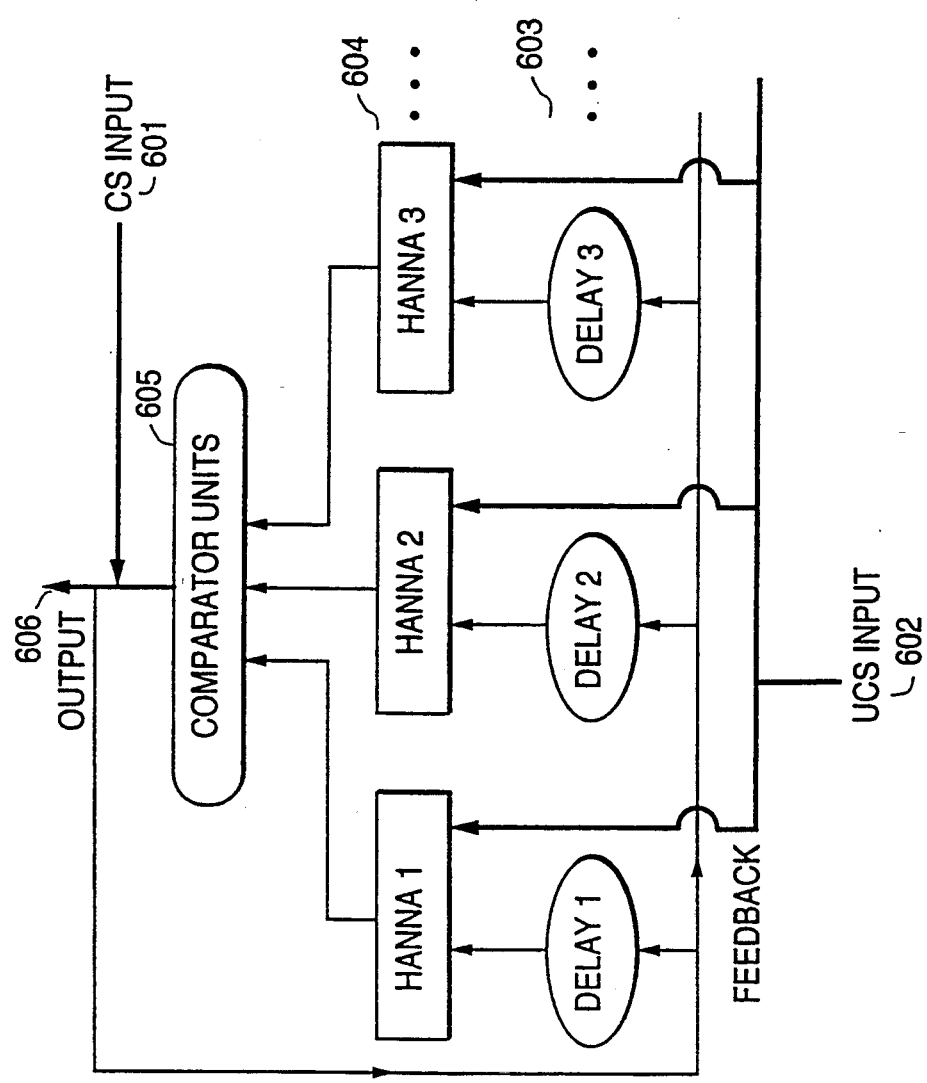
FIG. 14 shows substitution of the HANNAs of FIG. 13 for the HANNs of FIG. 1.

HANNAs may be used as subnetworks according to the invention FIG. 14. Similar to the architecture in FIGS. 1 and 5, there is a CS input 601, a UCS input 602, delay elements 603 which transmit the CS input 601 to the HANNA subnetwork 604. The comparator units 605 process the signals from the subnetworks 604, and produce a system output 606.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

CITED DOCUMENTS

The documents listed below are incorporated herein by reference to the extent that they supplement, explain, provide a background for, or teach, methodology, techniques, and/or compositions employed herein.

Alkon, D. L. (1987) Memory Traces in the Brain (Cambridge University Press, Cambridge).
Alkon, D. L. (1989) Sci. Am. July, 42–50.
Alkon, D. L., Blackwell, K. T., Barbour, G. S., Rigler, A. K., Vogl, T. P. (1990) Bio. Cybern. 62, 363–376.
Alkon et al. U.S. Pat. No. 5,119,469.
Buhmann, J., Schulten, K. (1987) Europhys. Lett. 4, 1205–1209.
Coolen, A. C. C., Ruijgrok, Th. W. (1988) Phys. Rev. A 38, 4253–4255.
Dehaene, S. Changeux, J. P., Nadal, J. P. (1987) Proc. Natl. Acad. Sci. USA 84, 2727–2731.
Fukushima, K. (1973) Kybernetik 12, 58–63.
Fukushima, K. (1988) Neural Networks 1, 119–130.
Grossberg, S. (1976) Biol. Cybern. 23, 121–134.
Guyon, I., Personnaz, L., Nadal, J. P., Dreyfus, G. (1988) Phys. Rev. A 38, 6365–6372.
Hebb, D. O. (1949) The Organization of Behavior (John Wiley, New York).
Hopfield, J. J. (1982) Proc. Natl. Acad. Sci. USA 79, 2554–2558.
Kleinfeld, D. (1986) Proc. Natl. Acad. Sci. USA 83, 9469.
Lippmann, R. P. (1989) Neural Computation 1, 1–38.
McCulloch, W. S. and Pitts, W. (1943) Math. Biophys. 5, 115–133.
Nishimori, H., Nakamura, T., Shiino, M. (1990) Phys. Rev. A 41, 3346–3354.
Peretto, P., Niez, J. J. (1985) in Disordered Systems and Biological Organization Bienenstock, E. et al. (Ed.) (Springer-Verlag, New York) 171–185.

Sompolinsky, H. and Kanter, I. (1986) Phys. Rev. Letts. 57, 2861.

Tank, D. W., Hopfield, J. J. (1987) Proc. Natl. Acad. Sci USA 84, 1896–1900.

Unnikrishnan, K. P., Hopfield, J. J., Tank, D. W. (1991) IEEE Trans. Signal Processing 39, 698–713;

Wang, L., and Ross, J. (1990a) Proc. Natl. Acad. Sci. USA 87 988–992.

Wang, L., and Ross, J. (1990b) Proc. Natl. Acad. Sci. USA 87 7110–7114.

Wang, L., and Ross, J. (1991a) Biol. Cybern. 64, 231–241.

Wang, L., and Ross, J. (1991b) Phys. Rev. A 44, R2259–2262.

Wang, L., and Ross, J. (1992) in Methods in Neurosciences Vol. 10: Computers and Computations in the Neurosciences, P. M. Conn, Ed. (Academic Press, San Diego).

Zipser, D. (1986), Behav. Neurosci. 100, 764–776.

What is claimed is:

1. A computer-based, artificial neural network system for learning, recognizing, and generating a temporal-spatial sequence, said system comprising:

(a) a parallel array of hetero-associative neural subnetworks for receiving signals from input channels of said system, said neural subnetworks producing output neuron signals, said output signals including a "don't know" answer;

(b) a comparator element comprising comparator units for receiving an input signal from a corresponding output neuron signal in each subnetwork, said comparator including an averager for averaging said output signals produced by said neural subnetworks to produce a comparator output signal; and (c) a delay element linking said comparator output signal with each said neural subnetwork by means of a signal that travels from the comparator output to each said subnetwork over signal transmission pathways of different lengths.

2. The system of claim 1, wherein the neural subnetworks are neural networks of the Dynamically Stable Associative Learning Network (DYSTAL) type.

3. The system of claim 2, wherein there are three DYSTAL neural networks in the parallel array of heteroassociative neural subnetworks.

4. The system of claim 1, wherein the signals from the input channels received by the subnetworks are generated from a visual image of a spatial temporal sequence.

5. The system of claim 1, wherein the comparator element output signal is determined by a comparator rule, wherein a comparison is made between a critical fraction, and a number of conflicting or "don't know" answers output by the subnetworks.

6. The system of claim 5, wherein the critical fraction is two/thirds and the number of subnetworks is three.

7. The system of claim 1, wherein the input is a vector of signals.

8. The system of claim 1, further defined as implemented in an integrated circuit.

9. A method of associating patterns presented to a neural network system in a temporal sequence, said method comprising the steps of:

(a) simultaneously presenting signals from pairs of elements of sequences of spatial patterns to a conditioned stimulus channel and an unconditioned stimulus channel of the system, said channels transmitting signals to an array of neural subnetworks by means of a delay element, said subnetworks sending signals to comparator units;

(b) training the system to learn associations of elements presented to the system at successive times in a temporal sequence;

(c) presenting to the conditioned stimulus channel of the system, elements of a sequence to be tested by the system; and (d) testing the sequence by using the associations learned during training to predict successive elements in the sequence to be tested.

10. The method of associating patterns of claim 9, wherein the conditioned stimulus channel and the unconditioned stimulus channel receive signals generated from pairs of letters.

11. The method of associating patterns of claim 9, wherein the sequence to be tested is only a portion of the training sequence.

12. The method of associating patterns of claim 9, wherein training the system is accomplished by use of patches.

* * * * *